United States Patent Office 3,066,953
Patented Dec. 4, 1962

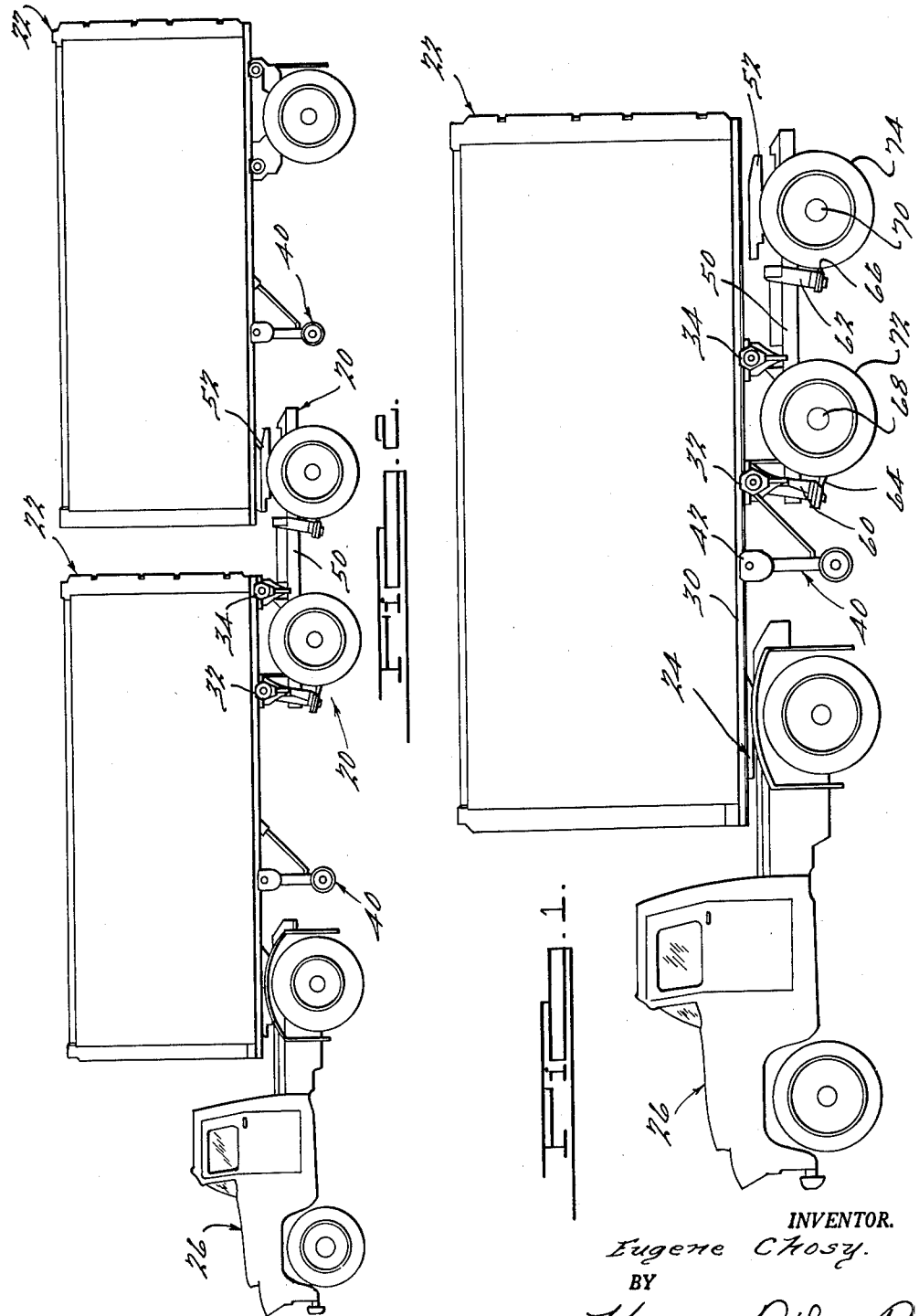

3,066,953
COMBINATION WHEEL BOGIE AND DOLLY
Eugene Chosy, Grosse Pointe Farms, Mich., assignor to Fruehauf Trailer Company, Detroit, Mich., a corporation of Michigan
Filed Aug. 7, 1961, Ser. No. 129,749
1 Claim. (Cl. 280—418)

This invention relates generally to shipping apparatus and more particularly to a combination wheel bogie and dolly.

The increased utilization of unitized shipping containers for the transportation of goods has created the need for a wheel suspension capable of functioning as a single rear wheel suspension that accommodates a second shipping container for double operation. Preferably, such a wheel suspension is provided with a coupling means that accommodates conventional trailers, shipping containers, or the like, and is relatively easily adjustable with respect to such shipping apparatus.

The foregoing problem is solved, in accordance with the instant invention, by a combination wheel bogie and dolly that functions in one condition as a wheel suspension for a single trailer body container and, upon movement thereof longitudinally rearwardly, functions as both a wheel suspension for the forward container and as a dolly having a fifth wheel thereon for the support of a second shipping container or trailer to facilitate double operation. The combination wheel bogie and dolly is compatible with existing container constructions, and conventional trailers adapted to utilize a longitudinally adjustable wheel bogie, for example, the adjustable suspension disclosed in application Serial No. 38,826, filed June 27, 1960 for: Trailer Suspension and assigned to the assignee of the instant invention.

Accordingly, one object of the instant invention is a combination wheel bogie and dolly for selectively supporting one or more shipping containers or the like.

Another object is a combination wheel bogie and dolly that is compatible with conventional shipping apparatus.

Another object is a combination wheel bogie and dolly that is movable completely under a shipping container for use as a single trailer.

Another object is a wheel bogie having a fifth wheel at one end thereof.

Other objects and advantages of the instant invention will be apparent from the following specification, claims and drawings, wherein:

FIGURE 1 is a side elevational view showing the combination wheel bogie and dolly moved forwardly under a shipping container which is coupled to a conventional tractor for use as a single trailer; and FIG. 2 is a side elevational view of a pair of shipping containers and a conventional tractor coupled in operative association for double operation by a combination wheel bogie and dolly in accordance with the instant invention.

As best seen in FIGURE 1 of the drawings, a combination wheel bogie and dolly 20, in accordance with an exemplary embodiment of the present invention, is shown operatively coupled to, for example, a shipping container 22. The forward end of the shipping container 22 is provided with a kingpin (not shown) which is supported on a fifth wheel 24 of a tractor 26 in the conventional manner.

The container 22 is provided with longitudinally extending lower rails 30 on opposite sides thereof for the acceptance of laterally spaced pairs of lockable jaws 32 and 34. The jaws 32 and 34 have internal rollers and are preferably constructed as disclosed in the aforementioned patent application.

A suitable landing gear 40 has a movable and lockable jaw 42 for adjustable gripping engagement with the side rails 30 so as to be positionable longitudinally of the container 22.

The combination wheel bogie and dolly 20 comprises a frame 50 of generally rectangular horizontal cross-section for the support of the pairs of rail-gripping jaws 32 and 34 and for the support of a conventional fifth wheel 52. It is to be noted that the jaws 32 and 34 extend upwardly above the frame 50 so that clearance is provided for the fifth wheel 52 under the container 22 when the wheel bogie and dolly 20 is moved forwardly thereunder. A pair of hangers 60 and 62 extend downwardly from the frame 50 for the support of conventional torque rods 64 and 66, respectively, which are secured to a pair of longitudinally spaced axles 68 and 70. Pairs of wheels 72 and 74 are supported on the axles 68 and 70, respectively, by conventional springs (not shown) that extend vertically between the axles 68 and 70 and the frame 50 of the combination wheel bogie and dolly 20.

As best seen in FIG. 2, the combination wheel bogie and dolly 20 provides for the coupling of two shipping containers 22 for double operation. The combination wheel bogie and dolly 20 is moved rearwardly until the jaws 34 are positioned at the rear end of the rails 30 of the forward container 22. In this position, the fifth wheel 52 is exposed for the acceptance of a kingpin (not shown) on the rearward trailer 22.

It is to be understood that the specific construction of the improved combination wheel bogie and dolly herein disclosed and described is presented for the purpose of explanation and illustration and is not intended to indicate limits of the invention, the scope of which is defined by the following claims.

What is claimed is:

In combination with a pair of shipping containers having longitudinally extending rails for adjustably engaging a wheel suspension and a kingpin for engagement with a fifth wheel, respectively, a combination wheel bogie and dolly movable substantially completely under one of said containers for use as a rear wheel suspension therefor in one condition and movable rearwardly of said one container to a second position so as to be usable as a combination rear wheel suspension for the one shipping container and fifth wheel for the other shipping container in another condition, selectively, said combination wheel bogie and dolly comprising a frame, means depending from said frame for the support of a plurality of road-contacting wheels, lockable means at one end of said frame extending upwardly therefrom for releasably and adjustably engaging the longitudinally extending rails on said one shipping container, and a fifth wheel at the other end of said frame for engagement with the kingpin on said other shipping container, said lockable means extending upwardly relatively higher than said fifth wheel to facilitate movement of said combination wheel bogie and dolly completely under said one shipping container when operating in said one condition.

References Cited in the file of this patent
UNITED STATES PATENTS

| | | |
|---|---|---|
| 1,887,118 | Collinge | Nov. 8, 1932 |
| 2,513,552 | Dove | July 4, 1950 |
| 2,841,094 | Schumacher | July 1, 1958 |
| 2,963,986 | Dobson | Dec. 13, 1960 |